March 1, 1966 R. D. CHAPMAN 3,238,287
METHOD FOR ENCAPSULATING A HEADED MEMBER WITH A MOLTEN MATERIAL
Filed April 27, 1962 2 Sheets-Sheet 1

INVENTOR.
Robert D. Chapman.
BY
ATT'Y.

March 1, 1966          R. D. CHAPMAN          3,238,287

METHOD FOR ENCAPSULATING A HEADED MEMBER WITH A MOLTEN MATERIAL

Filed April 27, 1962          2 Sheets-Sheet 2

INVENTOR.
Robert D. Chapman.
BY
ATT'Y.

United States Patent Office 3,238,287
Patented Mar. 1, 1966

---

3,238,287
METHOD FOR ENCAPSULATING A HEADED MEMBER WITH A MOLTEN MATERIAL
Robert D. Chapman, Roselle, Ill., assignor to Illinois Tool Works Inc., Chicago, Ill., a corporation of Delaware
Filed Apr. 27, 1962, Ser. No. 190,530
3 Claims. (Cl. 264—276)

This invention relates in general to a method for encapsulating a headed metal member in plastic, and more particularly relates to a method for injection molding a plastic head on a fastener member having a shank portion and a head portion which is larger than said shank portion.

There are many applications for headed members having a head portion which is of different material than the shank portion. One example of such a part is a molding clip for use with a trim panel on an automobile which has a plastic head and a threaded metallic shank. In the manufacture of these molding clips, there have been difficulties encountered in attempting to manufacture these parts in a fast, trouble-free, repetitive manner by mass manufacturing techniques. For example, in manufacturing a molding clip with a plastic head, ordinary threaded screws or bolts admirably serve to provide the threaded shank and an enlarged head portion for firm anchoring in the plastic material which is molded to the head. However, screws or bolts (or for that matter most metallic parts), have a fairly wide range of tolerances as compared to the tolerances of a molding apparatus and the tolerances required to prevent leakage of the molded material around the aperture where the screw shank extends outwardly from the mold cavity. Thus, in manufacturing molded plastic heads upon bolts, the manufacturer usually has to resort to expensive and elaborate means to prevent the molten material from extending along the threads of the threaded member.

It is a general object of this invention to provide a method for encapsulating the head of the threaded member with molten material in a manner which will accommodate wide tolerances on the metal headed member.

A more specific object of this invention is to provide a method for biasing the head of a fastener member into engagement with the margins of the aperture in the mold cavity for at least a portion of the molding cycle and then withdrawing the biasing means during the molding cycle.

It is a further object of this invention to provide a method for using conventional injection molding machinery which is easy to carry out, is trouble free, and well suited for the purposes for which it was conceived.

While the particular structural features of specific embodiments shown in the drawings for carrying out the method are important, it is to be understood that the precise feature shown and described may be varied within the broader aspects of the invention. To acquaint those skilled in the art with forms of construction of equipment for carrying out and methods of practicing the invention, the invention will now be described in connection with the accompanying drawings, in which.

While this invention shall be shown and discussed relative to the encapsulating of the head of a bolt member with plastic material, the shape of which is molded into the form of a tapered molding clip, it is to be expressly understood that the invention has a much wider application and thus the shape of the molded material is to be considered illustrative rather than limiting.

Figure 1:
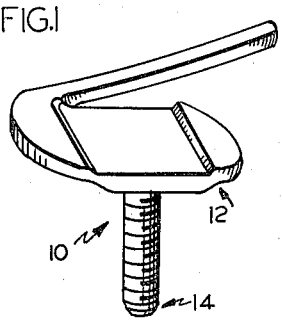
FIG. 1 is a perspective view of one form of part that can be made by the methods of this invention.
Figure 2:
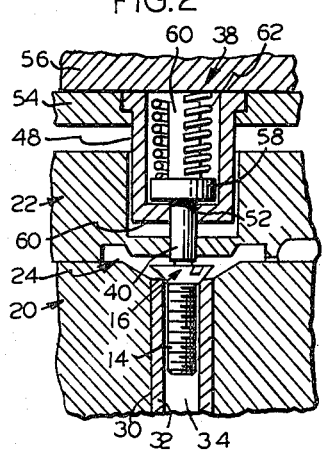
FIG. 2 is a somewhat diagrammatic sectional view of the mold portions of an injection molding machine just prior to the inflow of molten plastic.

The molding clip 10 shown in FIG. 1 is of the variety more particularly shown and described in the copending application entitled: Fastener Assembly and Nut Construction having Serial No. 167,348, filed January 19, 1962, and assigned to the same assignee. For purposes of this invention the exact configuration of the head portion 12 which is made of plastic is not too pertinent except that it illustrates an application where the juncture between the plastic portion 12 and the threaded shank 14 must be sharp, smooth, well defined, and free of flashing. As shown in FIG. 2 of the drawing, an ordinary bolt member having a threaded shank portion 14 and an enlarged head 16 has a conical surface 18 intermediate the largest diameter of the head portion 16 and the shank 14. The bolt member is disposed such that the head portion 16 is in a mold cavity 24 formed by a lower mold means member 20 and an upper mold means member 22. It will be understood that the mold members 20 and 22 are relatively movable to each other and the denomination of upper and lower mold members as such has no meaning except for purposes of discussion since the molds may be placed in horizontal or vertical positions as suitable and desired to fit manufacturing convenience. While a single cavity mold is shown, it will be understood that multiple cavity molding is contemplated.

Figure 3:
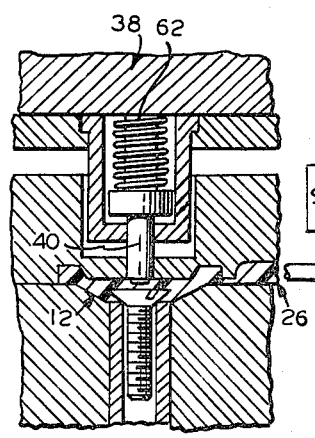
FIG. 3 is a view similar to FIG. 2 showing the relative position of the parts after introduction of the molten plastic to the molds.

As shown in FIG. 3, the mold cavity 24 has a suitable entrance 26 connected to a source 28 of molten plastic material, the entrance and the source both being shown semidiagrammatically. The source of molten material is a conventional injection molding machine mechanism which forces molten plastic material of suitable nature, as is well understood, under pressure into the mold cavity. The lower mold means 20 is formed with a bore 30 which extends outwardly from the mold cavity 24. Within the bore 30 is an insert 32 which is cylindrical in nature to define a bore 34 which receives the threaded shank 14 of the bolt member. It will be noted that the upper margins of bore 34 at 36 are of such as size that they are adapted to engage the conical surface 18 on the underside of the head 16 of the bolt member.

Biasing means 38 for holding the bolt member firmly in engagement with the margins 36 of insert 34 comprises a spring loaded pin 40 having an end portion 42 of reduced diameter to provide a shoulder 44. The end portion 42 is engageable with the top portion of the head 16 of the bolt member when the mold cavity 24 is empty of plastic. The pin 40 is relatively movable to and disposed within a bore 46 in the upper mold means 22. It will be noted that the bore 46 is preferably coaxial with the bore 34.

Figure 2A:
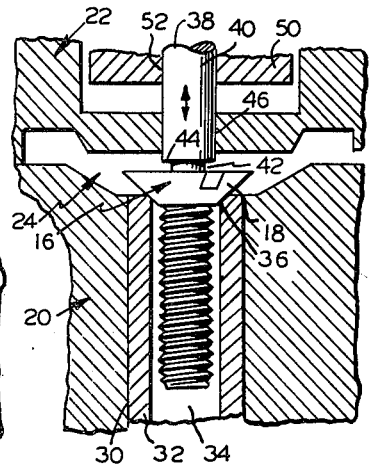
FIG. 2A is an enlarged fragmentary view of a portion of FIG. 2.

In the embodiment shown in FIGS. 2, 2A and 3, the pin 40 is mounted for relative movement to a hollow boss 48 having an end surface 50, said end surface 50 being formed with an aperture 52 affording movement of the pin which is mounted therein. The hollow boss 48 is dependingly mounted on a plate 54 and is covered by a second plate 56. The pin 40 is formed with an enlarged portion 58 which provides a shoulder for engagement with surface 50 of the boss and is further formed with an upwardly extending portion 60 which serves as a spring guide for spring 62 which surrounds the extension 60. The height of the interior of the hollow boss 48 is slightly greater than the height of the extending portion 60 of the pin 40. Thus relative movement of the pin under the influence of the spring 62 is limited by surface 50 and plate 56. The spring 62 normally urges end portion 42 of the pin downwardly or outwardly of the boss until surface 58 engages the inside of boss end surface 50. Upward movement of the pin is limited by the engagement of the end of the projecting portion 60 of pin 40 with plate 56. This may be varied to suit.

While the foregoing discussion of molds 20 and 22 have been in terms of the molds of an injection molding machine, it will be appreciated that the molds and concepts about to be discussed are equally applicable to molds of a transfer molding machine and certain types of compression molding machines.

When molten plastic enters the mold cavity 24 through a suitable entrance such as 26, it is necessary that the biasing means 38 engage and bias the head of the headed member until such time as the plastic covers the top surface of the headed member to a greater extent than the surface area on the underside of the head 16. Stated another way, the plastic material upon first entering the mold cavity 24 will apply pressure to the exposed conical underside surface 18 on the head of the bolt member. This will normally tend to dislodge the head 16 from contact with edge 36 of the aperture 34. However, once the level of the plastic within the mold is sufficiently high so as to cover a greater area on the top surface of the head 16 than the exposed area of surface 18, the head of the bolt member will remain in tight sealing engagement with edge 36. Thus, the biasing means must be so arranged and actuated so as to preclude removal from engagement with the head bolt member until such time as the plastic covers at least a portion of the top of the bolt member greater in area than the exposed underside portion of the head of the bolt member.

The spring rate of spring 62 is intentionally less than the pressure of the molten plastic emanating from source 28. This makes the removal of the pin from engagement with the top of the bolt "work dependent" inasmuch as the pressure of the molten plastic on shoulder 44 of pin 40 will cause the pin to move upwardly against the bias of the spring 62 only after the upper surface of the head 16 is covered with plastic.

The molds 20–22 and the cavity 24 may be arranged and actuated in such a manner that the plastic material upon entering the molds through entrance 26 may freeze or solidify the plastic material around the margins where the conical surface 18 engages portion 36 of the insert 32. While this method is possible, it is not as versatile in application as the hydraulic concepts discussed above. However, certain configurations of heads (not shown) may require the freezing of the plastic material around the margin where the conical surface 18 engages portion 36 of the insert 32 prior to removal of the biasing means. Once this area becomes frozen or solidified, the molten material will then completely fill up the mold and there is no chance of leakage of the molten material down the screw threads to provide an underdesired flashing.

It will be observed that the construction just discussed will allow a very wide range of tolerances in the screw parts to be encapsulated. The arrangement is self centering and positive for fast repetitive molding. Further, no special gripping tongs or complicated mechanisms are necessary to grab the bolt from the underside thereof to force same into tight engagement with margins 36 and possibly simultaneously distort the screw threads. Further, the spring means 62 and the pin means are arranged with suitable geometry so that they are "work dependent" rather than "time dependent" in that the molten material itself causes the pin 40 to rise from engagement with the head 16. It will also be further observed that the pin 40 moves in the direction of mold closing and opening which is advantageous from the standpoint of machinery design.

Figure 4:
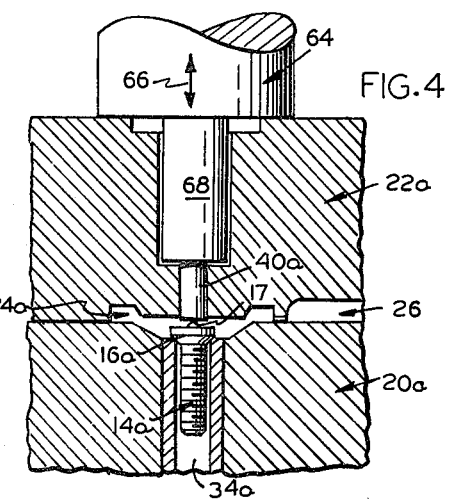
FIG. 4 is a view similar to FIG. 2 showing a modified form of actuation means for biasing the headed fastener into sealing relationship with an aperture in the mold cavity, the parts being disclosed in the relative positions they assume just prior to the entrance of the molten plastic to the mold cavity.
Figure 5:
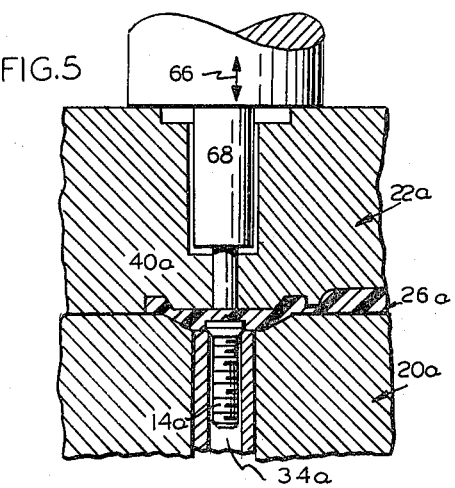
FIG. 5 is a view of the embodiment shown in FIG. 4 after the introduction of the molten material to the mold cavity.

The embodiment shown in FIGS. 4 and 5 is substantially similar to the foregoing and similar parts will be identified with similar reference numerals with the addition of the suffix "a." Only the essential differences will be discussed, the other parts of the operation being substantially identical. The pin 40a in the apparatus shown in FIGS. 4 and 5 is independently actuated by suitable biasing means 64 in the form of an air cylinder or a hydraulic cylinder 66 having an extension 68 firmly attached to the upper portion of the pin 40a. The actuation means 66 is timed so as to withdraw the end of the pin 40a from engagement with a nib 17 formed on the head 16a of the fastener member disposed in the bore 34a during the filling cycle of the plastic material and after the plastic material covers a greater portion of the area of the top of the head than the area on the underside of the head radially outward of the margins of the aperture 34a. The initial position of the pin 40a is shown in FIG. 4 and the retracted position is shown in FIG. 5.

Figure 6:
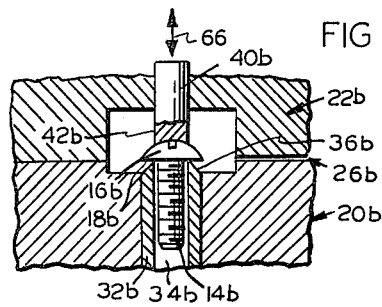
FIG. 6 is a sectional view similar to FIGS. 2 and 4 showing an alternate construction.

The embodiment shown in FIG. 6 of the drawings is essentially similar to the foregoing and similar parts wlil be shown with similar reference numerals with the addition of the suffix "b." The pin 40b is actuatable by a suitable mechanism 66 so as to be caused to be in engagement with the head 16b of the bolt member disposed in the bore 34b. The major distinction of this embodiment is that it will accommodate a head 16b which has a flat under surface 18b. The edge of the insert 32b at 36b is tapered so as to provide a sharp marginal surface for engaging the underside of the head of the bolt member. The end 42b of the pin 40 is formed with centering means to center the head 16b which is here shown as curvilinear so that the shank 14b will be essentially disposed in the center of the bore 34b.

Figure 7:
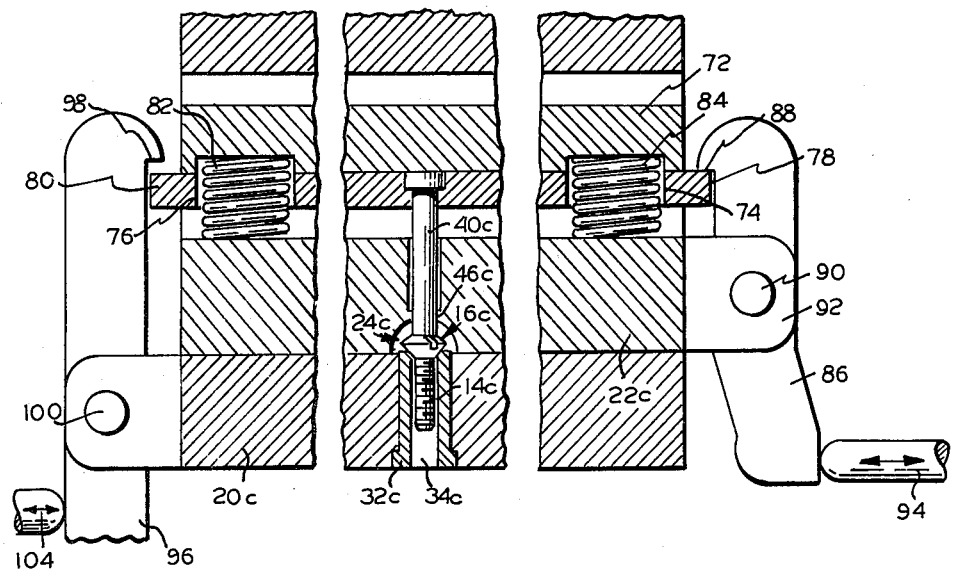
FIG. 7 is a view similar to FIG. 2 on a slightly larger scale showing still another embodiment of the invention just prior to introduction of the molten plastic to the mold cavity.
Figure 8:
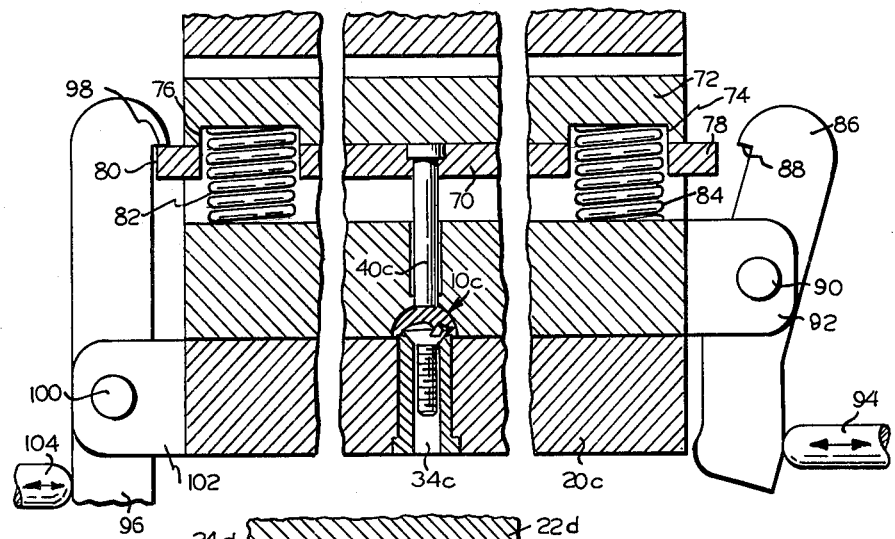
FIG. 8 is a view of the embodiment of FIG. 7 after introduction of the molten plastic to the mold cavity.

The embodiments shown in FIGS. 7 and 8 are substantially similar to the foregoing and similar parts will be identified by similar reference numerals with the addition of the suffix "c."

The apparatus shown in FIGS. 7 and 8 has a pin means 40c which extends through an aperture 46c into the mold cavity 24c. The pin means 40c engages the head 16c of the bolt member and the shank 14c is disposed within the aperture 34c, all essentially as shown in the earlier embodiments. The pin means 40c is fixedly attached to plate member 70 which is in turn fixedly attached to plate member 72. Members 70 and 72 are apertured at opposite sides of pin 40c as shown in FIGS. 7 and 8 with suitable shallow spring retaining bores 74 and 76. Plate member 70 extends outwardly of plate 72 and molds 20c–22c to provide lug surfaces 78 and 80. Heavy biasing springs 82 and 84 are disposed in the bores 74 and 76 to engage and exert a constant biasing force on plates 70–72 in a separating direction to the upper mold means 22c. A pivotally mounted lever member 86 is formed with a hook surface 88 and is mounted on pivot 90 on an extension lug 92 on the upper mold means 22c. An actuator 94 shown semi-diagrammatically is operable to move the hook member surface 88 into and out of engagement with lug 78. Another lever member 96 is mounted on the opposite side of the mold means on the lower mold member 20c. The member 96 is mounted on an extension lug 102 to the mold means 20c and is pivotally mounted on the lug at 100 for actuation by an actuator shown semi-diagrammatically by an arrow 104. The lever member 96 has a hook surface 98 engageable with extending surface 80 of plate 70.

As shown in FIG. 7, pin 40c is disposed and held in engagement with the head 16c of the bolt member by lever 86. After the molten material is partially injected into the mold cavity 24c, actuator 94 releases surface 88 from lug 78 causing plates 70 and 72 to move upwardly under the biasing springs 82 and 84 causing the end of the pin 40c to retract to the position shown in FIG. 8. Further upward movement is restrained by surface 98 engaging surface 80 on plate 70. Thus, the bolt member is retained in its positon in the bore 34c during the initial partial filling of the mold and then is withdrawn during the latter stage of the filling of the mold. After the part 10c is finally molded, the mold parts are actuated so that the end of pin 40 serves to knock out the molded part 10c. The actuation of pin 40c is in a manner to project downwardly sufficiently to clean the aperture 46c. Thus, material (such as sludge) that would normally tend to accrue at that point will be removed. The moving parts are so arranged and are so actuated that the pin 40c is normally actuated downwardly at the knock-out part of the cycle a greater distance than that shown in FIG. 7 to thereby insure a greater cleaning effect on the aperture 46c.

Figure 9:
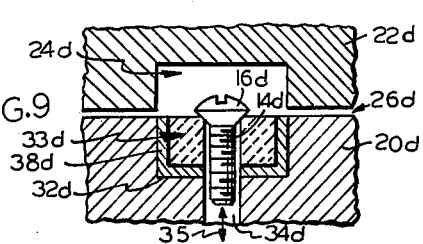
FIG. 9 is a view of an alternate construction of equipment for carrying out the prescribed method.

The embodiment shown in FIG. 9 of the drawings is essentially similar to the foregoing and similar parts will be shown with similar reference numerals with the addition of the suffix "d." The essential distinction of the embodiment shown in FIG. 9 of the drawings is that magnetic biasing means 38d is used. The magnet is stationary in distinction to having a biasing means which is movable. The insert means 32d is in the form of an annular ceramic magnet which is capable of withstanding the molding temperatures in the neighborhood of 500 degrees Fahrenheit. This ceramic magnet is so disposed in a nonpermeable insert 32d to define an extension of bore 34d so that it will continually bias the head 16d of the screw into engagement therewith throughout the molding cycle. In this embodiment the knock-out means 35 (shown diagrammatically) for the molded part as finally molded must come up through the bottom of bore 34d as shown diagrammatically by the arrow 35. Of course, various form of electromagnets (not shown) could be used and are contemplated, the main advantage being a nonconstant biasing force of the permanent magnet.

While various embodiments of my invention have been shown and described, it is with full awareness that many modifications thereof are possible. The invention, therefore, is not restricted except insofar as is necessitated by the prior art and the spirit of the appended claims.

What is claimed as the invention is:

1. The method of encapsulating the head of an elongated member having a head and a shank comprising the steps of disposing the shank of said member in a first mold member having a shank receiving aperture larger than the radial dimension of said shank and smaller than the largest radial dimension of said head with said head being in engagement with the margins of said aperture, moving a second mold member into closed relationship with said first mold member in a manner to cause spring loaded biasing means associated therewith to impinge upon and positively cause a sealing relationship between said head and the margins of said shank receiving aperture, filling said first and second mold members with molten material under pressure to initially cover at least a portion of an area on the upper side of the head of the member, hydraulically overcoming the rated strength of said spring loaded biasing means engaging said head portion and moving said biasing means in to retracted position outside the confines of the mold cavity away from engagement with said head solely by the pressure of molten plastic entering said first and second mold members and completely filling said first and second mold members with molten plastic to totally encapsulate the head portion of said member.

2. The process set forth in claim 1 wherein said head portion of said headed member has an outwardly flaring conical surface intermediate the shank portion and the furthest radial extent of the head portion, said outwardly flaring conical surface being disposed in sealing engagement with the margins of said shank receiving aperture to said mold means at its entrance to said mold means.

3. The process set forth in claim 1 wherein said biasing means is directed along the central axis of said headed member and from the side thereof opposite to said shank portion of said headed member.

References Cited by the Examiner

UNITED STATES PATENTS

| 1,641,923 | 9/1927 | Davis | 264—276 |
|-----------|--------|-------|---------|
| 2,135,570 | 11/1938 | Ellis | 264—276 |
| 2,361,348 | 10/1944 | Dickson et al. | 264—278 |
| 2,658,238 | 11/1953 | Rizzo | 264—276 |
| 2,669,753 | 2/1954 | Hormann | 264—276 |
| 2,677,855 | 5/1954 | Mallory. | |
| 2,880,462 | 4/1959 | Lehman | 18—36 |
| 2,946,093 | 7/1960 | Everett | 18—36 |
| 3,061,888 | 11/1962 | Wadham | 264—24 |
| 3,081,497 | 3/1963 | Scherry | 264—276 |
| 3,089,199 | 5/1963 | Halacsy | 264—272 |
| 3,142,716 | 7/1964 | Gardener | 264—278 |

ROBERT F. WHITE, *Primary Examiner.*

MORRIS LIEBMAN, *Examiner.*

F. MARLOWE, I. S. SQUIRES, *Assistant Examiners.*